United States Patent [19]

White

[11] 4,090,414
[45] May 23, 1978

[54] TRANSMISSION CONTROL SYSTEM FOR SHUTTLE TYPE VEHICLES

[75] Inventor: Basil White, Rockford, Ill.

[73] Assignee: Twin Disc, Incorporated, Racine, Wis.

[21] Appl. No.: 786,880

[22] Filed: Apr. 12, 1977

Related U.S. Application Data

[63] Continuation-in-part of Ser. No. 676,923, Apr. 14, 1976, abandoned.

[51] Int. Cl.² .................. F16H 47/00; F16H 5/60; F16D 25/00
[52] U.S. Cl. .................................... 74/733; 74/335; 192/87.18
[58] Field of Search ............... 74/730, 732, 733, 731, 74/335; 192/87.13, 87.18, 87.19

[56] References Cited

U.S. PATENT DOCUMENTS

| 2,933,172 | 4/1960 | Fisher et al. | 192/87.13 |
| 3,151,718 | 10/1964 | Temple | 192/87.13 X |
| 3,239,020 | 3/1966 | Morris et al. | 74/730 X |
| 3,738,193 | 6/1973 | Sumiyoshi et al. | 74/731 |

FOREIGN PATENT DOCUMENTS

1,039,336  8/1966  United Kingdom .................. 74/733

*Primary Examiner*—Samuel Scott
*Assistant Examiner*—Lance W. Chandler
*Attorney, Agent, or Firm*—James E. Nilles

[57] ABSTRACT

A power transmission control system for vehicles where it is desired to reverse the vehicle direction at full throttle such as vehicles used in mining operations, off road application, or the like. The transmission includes selectively and hydraulically operated friction-type clutches and hydraulic control circuits for actuation thereof. The hydraulically operated output clutches are used to change speed range of the transmission while input clutches are used to change speed and/or direction of the vehicle. The control mechanism permits the vehicle in motion to be shifted to a reverse direction at full throttle and the arrangement is such that when the shift is made, the output speed range clutch disengages or optionally drops to residual torque capacity, the forward clutch remains fully engaged, and the reverse clutch comes on fully to brake the input. Then both forward and reverse clutches are engaged. The input is then locked. The output speed range clutch is then brought to increased "brake mode" torque capacity. The output speed range clutch then functions as a brake to decelerate the vehicle. The static braking reaction torque is held by the locked up direction clutches. When the vehicle speed reaches a predetermined lower value (where it is almost stopped) that situation is sensed by the hydraulic control means and immediately thereafter and simultaneously the forward clutch is released and apply pressure on the braking (output speed range) clutch is permitted to increase to full value. The vehicle then accelerates in the opposite direction under the influence of the torque converter. This control system also provides means for quick and smooth full throttle shifts at and near vehicle stopped condition; that is for either a neutral into range shift or a directional shift.

9 Claims, 5 Drawing Figures

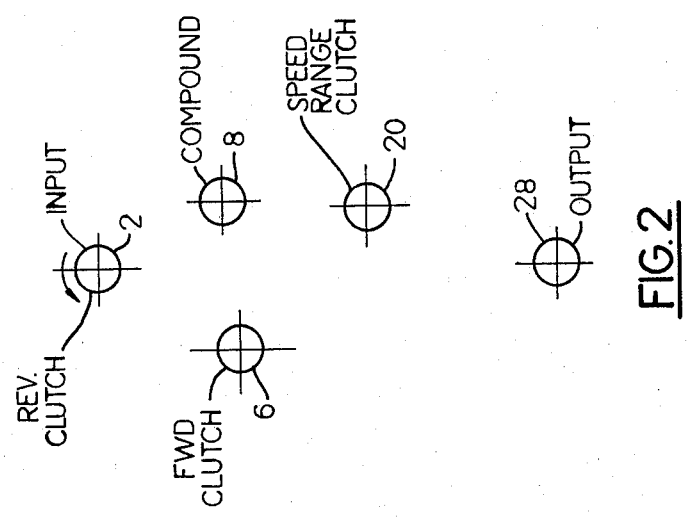
_FIG.2_
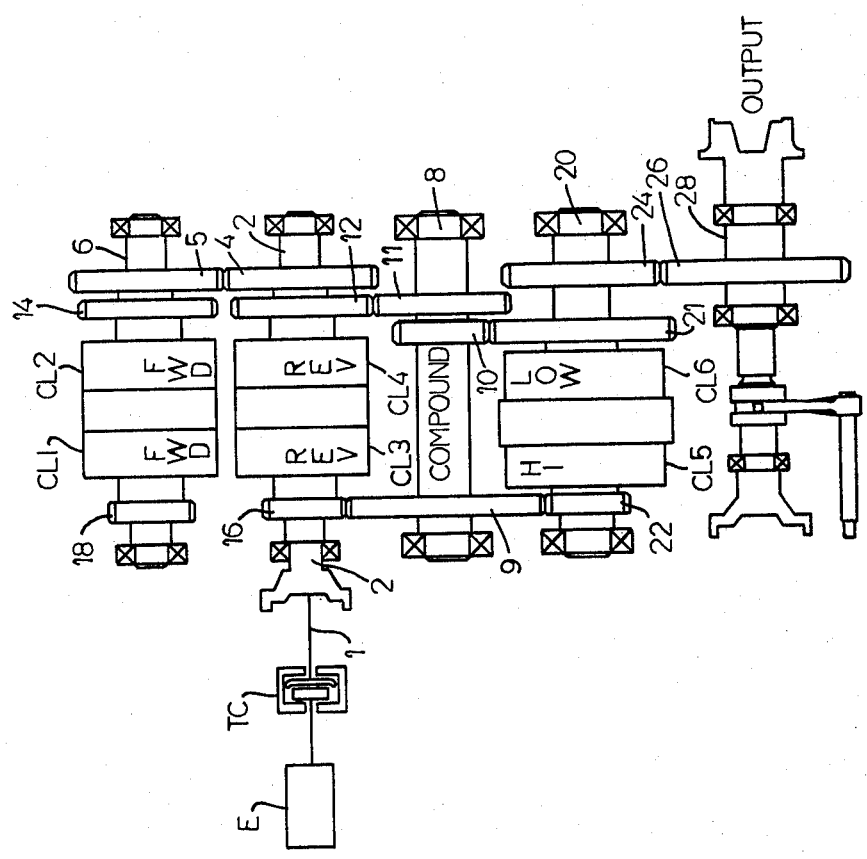
_FIG.1_

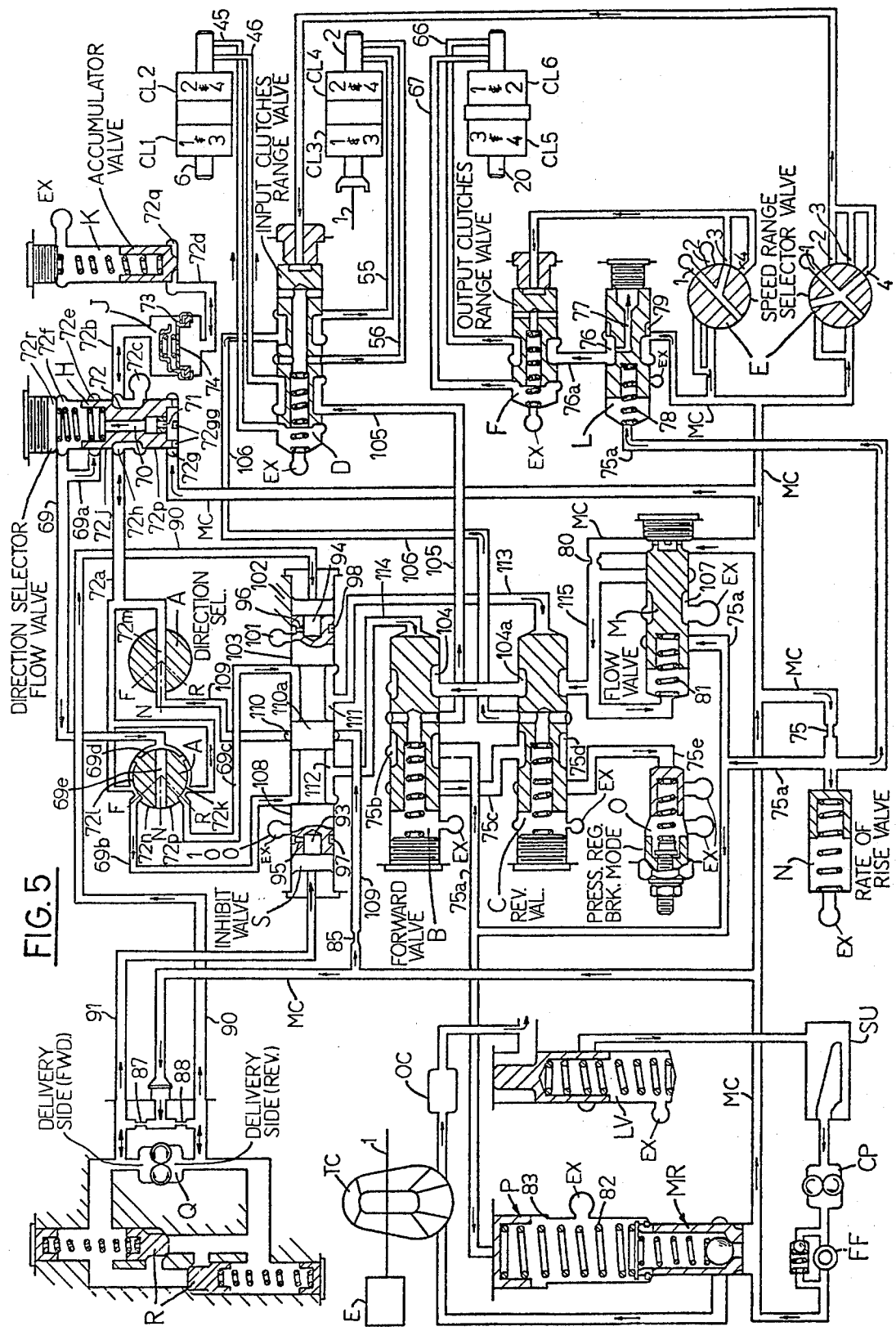

4,090,414

TRANSMISSION CONTROL SYSTEM FOR SHUTTLE TYPE VEHICLES

REFERENCE TO RELATED CO-PENDING APPLICATION

This application is a continuation-in-part application from my co-pending United States patent application Ser. No. 676,923, filed Apr. 14, 1976, now abandoned and entitled "Transmission Control System for Shuttle Type Vehicles".

BACKGROUND OF THE INVENTION

In the prior art devices of the type to which the present invention pertains, the (1) input directional clutches require dynamic friction torque capacity in excess of torque converter stall torque and static friction torque capacity to hold a further excess negative speed ratio torque (This is a severe requirement in terms of load on mechanical components and heat energy rate applied to the friction clutches), or (2) input directional clutches friction torque capacity could be reduced to slip continuously to absorb both power from the torque converter and vehicle inertia energy to the completion of vehicle deceleration (This requires a relatively large volume and surface area clutch with abundant fluid cooling).

SUMMARY OF THE INVENTION

The present invention provides a hydraulically operated control system for a hydraulic torque converter input power transmission of the type havinfg a plurality of selective and hydraulically actuated friction type clutches, some of the clutches being used to change direction of the vehicle while other combinations of the clutches are used to effect speed changes in either direction of vehicle operation. More specifically, the hydraulic control system of the present invention permits the vehicle to be dynamically reversed in its direction at full throttle. When such a shift in direction is made, the output speed range clutch drops to residual torque capacity, the forward clutch remains fully engaged, and the reverse clutch comes on fully to brake the input. Then both the forward and reverse clutches are engaged. The input is then locked. The system then brings the output speed range clutch into increased "brake mode" torque capacity to thereby act as a brake, to decelerate the vehicle. The static braking reaction torque from the output range clutch is held by the locked up direction clutches. The system is such that when the vehicle speed reaches a predetermined lower value (where it is almost stopped), that situation is sensed by the control system. Immediately thereafter, the forward clutch is released and pressure on the braking (output speed range) clutch is permitted to increase to full value. The vehicle then accelerates in the opposite (reversed) direction under the influence of the torque converter absorption characteristic. Those characteristics determine the acceleration rate of the vehicle.

This control system also provides means for quick and smooth full throttle shifts at and near vehicle stopped condition; that is, for either a neutral into range shift or a directional shift.

An object of the present invention is to provide a hydraulic torque converter input, reversing type powershift trasmission having a means which permits full power reverse directional shifting, at "vehicle in motion" energy levels, which would otherwise thermally destroy the direction clutches.

When the reversing shift described above is made, the ensuing deceleration rate to stop, the transition, and subsequent acceleration in the opposite direction are to be relatively smooth.

The present invention insures that when specific full power shifts are made at or near a stopped condition, relatively shock-free and smooth acceleration occurs.

The present invention provides a control system of the above type which consists of means to (1) manually select an operation condition of direction and gear ratio; (2) means to effect substantially jerk-free and smooth deceleration, transition, i.e. (at stop), and acceleration of the vehicle when a shift to the direction opposite vehicle motion is made at above a predetermined low vehicle speed; this means encompasses the following sub-functions: (a) means to sense output speed and direction; (b) means to simultaneously fully engage two input clutches, one being forward and the other reverse as an input braking means and including means to fully release one of said input clutches when the transmission output has slowed to below a predetermined low speed; and (c) means to also simultaneously reduce the engaging apply pressure of a third output range clutch to a residual amount, followed immediately by an increased partial full apply pressure to said clutch, making it effective as an output braking means, said braking means effective only when both a forward and a reverse input clutch are simultaneously engaged; and (3) means to effect substantially jerk-free shift characteristic and smooth acceleration of the vehicle when full throttle directional or neutral into range shifts are made at or near a stopped condition; this means encompasses a means to simultaneously engage two input clutches, one being forward and the other reverse, as an input braking means and including means to release one of said clutches shortly thereafter.

These and other objects and advantages of the present invention will appear hereinafter as this disclosure progresses, reference being had to the accompanying drawings.

BRIEF DESCRIPTION OF THE DRAWINGS

FIG. 1 is a schematic view of the lay-out of the forward, reverse, and speed range clutches and their interconnecting gears;

FIG. 2 is an end view of the arrangement of the shafts shown in FIG. 1;

FIG. 5 is a schematic diagram of the control system of the present invention and also showing a portion of the power transmission.

DESCRIPTION OF A PREFERRED EMBODIMENT

Figure 3:
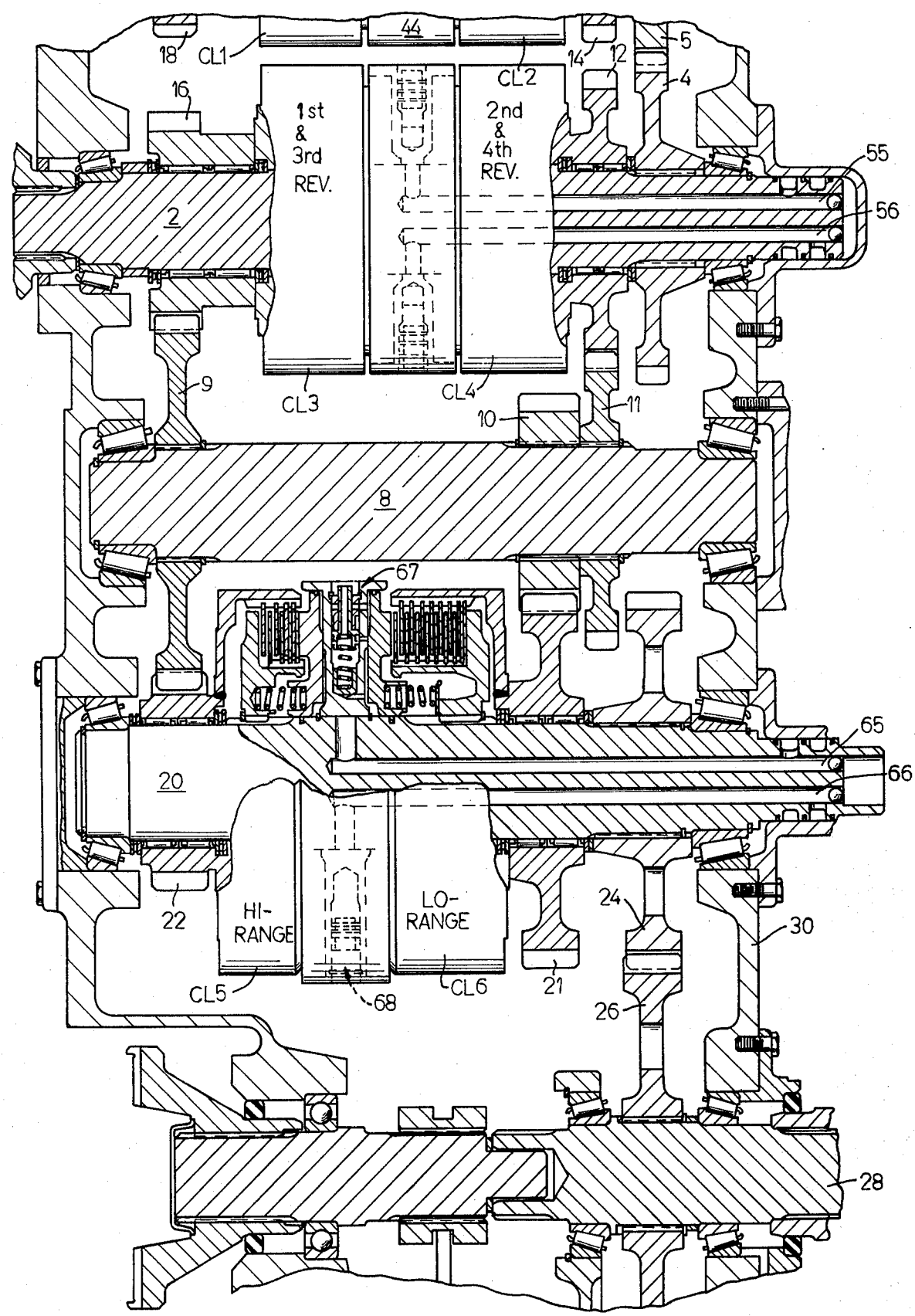
FIG. 3 is an enlarged view of a portion of the transmission shown, in FIG. 1, certain parts being shown as broken away and/or in section for the sake of clarity.

The general organization of the transmission provided by the present invention includes a torque converter TC which is driven by a source of power such as an engine E and which torque converter has a power output shaft 1 which delivers power to the directly connected power input shaft 2 of the gear shift mechanism. A pair of conventional friction plate type clutches CL3 and CL4 are mounted on the input shaft 2 and these duplex clutches or the centrifugal control valves therefor may be of the general type shown in one or more of the following U.S. Pat. Nos. 3,534,840 of Oct. 20, 1970; 3,537,557 of Nov. 3, 1970; 3,651,904 of Mar. 28, 1972; or 3,352,395 to Hilpert of Nov. 14, 1967.

Shaft 2 has a gear 4 splined thereto and which is in constant mesh with a gear 5 suitably splined to a forward rotation shaft 6. Another pair of hydraulically actuated friction plate type clutches CL1 and CL2 are mounted on shaft 6 and are of the same construction as clutches CL3 and CL4.

A compound gear shaft 8 has three gears 9, 10, and 11 fixed thereto for rotation therewith. Gear 11 is in constant mesh with gear member 12 that is rotatably journalled on shaft 2 and gear 11 is also in constant mesh with gear member 14 which is rotatably journalled on shaft 6. Gear 9 which is fixed on shaft 8 is in constant mesh with a gear member 16 journalled on shaft 2 and gear member 16 is also in constant mesh with gear member 18 rotatably journalled on shaft 6.

Shaft 2 and its clutches CL3 and CL4 are a reverse gear unit while shaft 6 and its clutches CL1 and CL2 are a forward gear unit. Shaft 2 is driven directly by the torque converter rotation in the reverse direction while the shaft 6 rotates in the forward direction in respect to vehicle travel in the example shown.

The transmission also includes another shaft 20 that has a gear member 21 rotatably journalled thereon and which is in constant mesh with gear 10 fixed to shaft 8. Shaft 20 also has a smaller gear member 22 rotatably journalled thereon and which is in constant mesh with the gear 9 fixed to shaft 8. Shaft 20 furthermore has a larger gear 24 splined thereto and which is in constant mesh and in direct gear drive with a gear 26 that in turn is axially splined or fixed to a power output shaft 28 of the gear mechanism.

Shaft 20 also has a pair of clutches CL5 and CL6 mounted thereon, clutch CL5 being the high range output clutch and has four pairs of clutch plates. Clutch CL6 is the low range output clutch and has eight pairs of clutch plates thereon to be described. The general configuration of the output clutches CL5 and CL6 is very similar to the input clutches previously referred to and as will appear.

All of the shafts 2, 6, 8, 20, 28 are suitably journalled in anti-friction bearings in the main frame 30 of the transmission.

Thus, the input to the transmission is from an engine driven hydraulic torque converter and consists of two clutch shafts 2 and 6, which shafts are directly geared to one another through a 1—1 ratio, the shafts constantly rotating in opposite directions.

Figure 4:
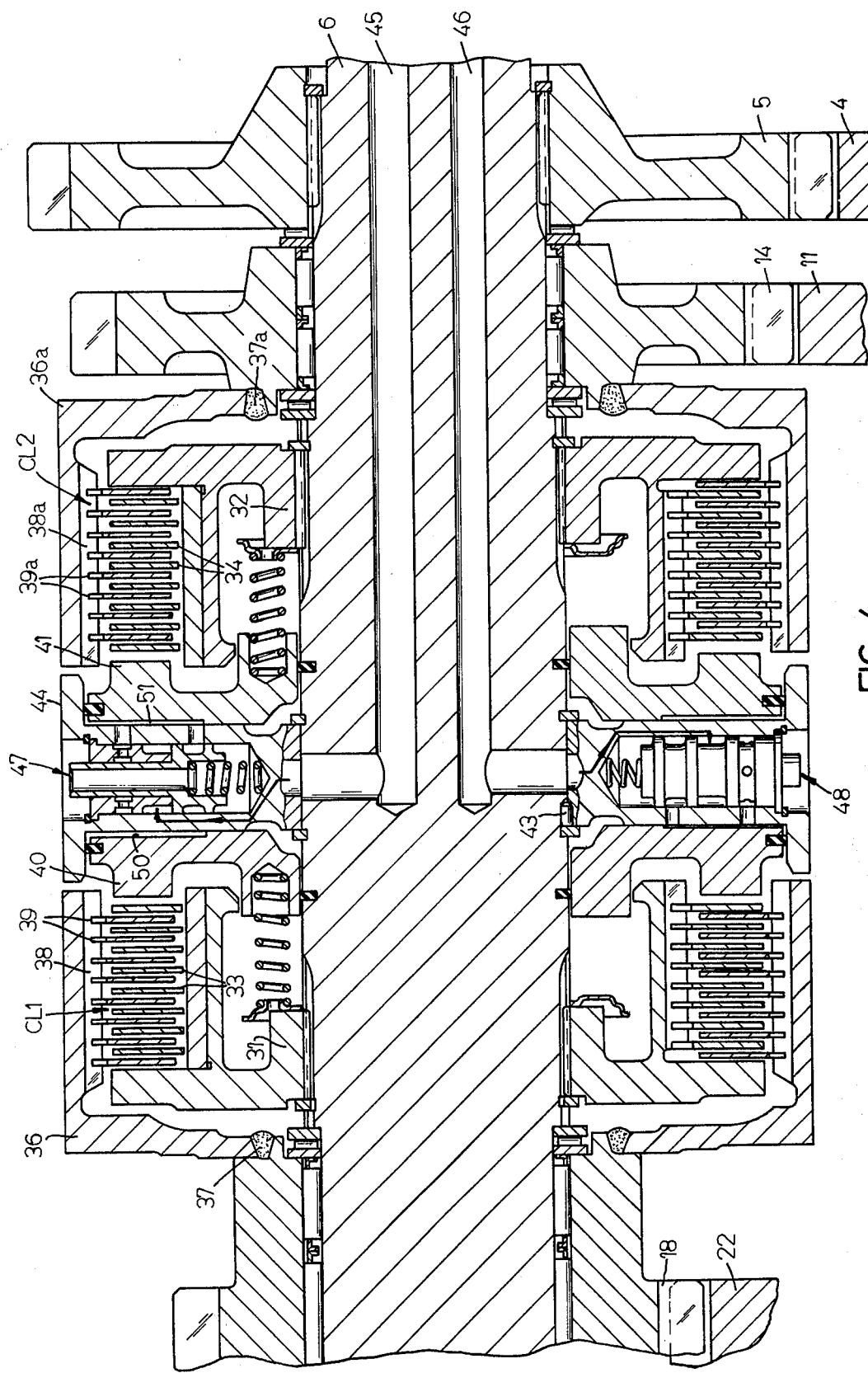
FIG. 4 is a further enlarged view of the forward clutches shown in FIG. 1 and as partially shown in FIG. 3.

Each clutch shaft 2 and 6 has two clutches mounted thereon, as above noted, and these clutches are similar in construction and a detailed explanation of clutchs CL1 and CL2 will now be referred to in connection with FIG. 4. Clutches CL1 and CL2 each has a hub 31 and 32, respectively, secured to shaft 6 by a spline connection as shown. These hubs have internally splined, steel clutch plates 33 and 34, attached to splined portions of the hubs. Gear member 18 has a drive ring or drum 36 welded as at 37 to the gear portion of the gear member 18 in the known manner and has a plurality of interior splines 38 which are in driving engagement with the friction faced, externally splined clutch plates 39. Thus, plates 33 and 39 form interleaved clutch plates that can be clamped together by the hydraulically actuated piston 40 in the known manner to thereby create a driving connection between the shaft 6 and the gear member 18. Clutch CL2 is similarly constructed and is actuated by the hydraulically actuated piston 41 in the same, known manner. Either clutch CL1 or clutch CL2 may be engaged to selectively and drivingly connect the shaft 6 with either gear member 18 or gear member 14. Parts in clutch CL2 which are similar to parts in clutch CL1 have been similarly numbered but with a suffix "a" and further reference to the construction of clutch CL2 is believed to be neither necessary or desirable.

The duplex clutch arrangement formed by clutch CL2 and clutch CL1 includes a central piston housing 44 that is fixed by pin 43 to the shaft 6 for rotation therewith.

Fluid pressure from the hydraulic control system to be described is introduced into either one of two rifle drillings 45 or 46 in shaft 6 which in turn leads to the centrifugally operated valves 47 and 48 in the central piston housing 44. These centrifugally actuated valves 47 and 48 are of the type shown for example in U.S. Pat. No. 3,352,395 of Nov. 14, 1967, and it is believed sufficient to say that through valves 47 and 48 pressure fluid may be introduced into either of the piston actuating chambers 50 and 51 of clutches CL1 or CL2 thereby pressurizing the respective chambers and urging the respective pistons into clamp-up engagement with their respective clutch plates. When pressure is relieved from the chamber, the pistons are spring returned to the clutch disengaged position as is known.

As previously mentioned, the construction and operation of clutches CL3 and CL4 are similar to clutches CL1 and CL2 and it is believed sufficient to say that pressure fluid introduced into either one of the two rifle drillings 55 or 56 of shaft 2 serves to actuate either clutch CL3 or clutch CL4 to thereby respectively cause shaft 2 to be drivingly engaged with either gear member 16 or with gear member 12. Thus, clutches CL3 and CL4 form the reverse clutch unit for driving the shaft 8 at either one of two speeds.

The above input clutch gears are directly geared through the compound or transverse shaft 8 to the output range clutch gears now to be described. The clutch CL5 is the high range output clutch and has four pairs of interleaved clutch plates which, when clamped together by the related hydraulically actuated piston, provide a driving connection between the gear member 22 and the shaft 20. Similarly, clutch CL6 is the low range clutch and has eight pairs of interleaved clutch plates which when clamped together by the related hydraulically actuated piston provides a driving connection between the gear unit 21 and the shaft 20. Clutches CL5 and CL6 and the central piston housing located therebetween are similar in construction to the previously described clutch units and a further description of their operation and function is not believed to be neither necessary nor desirable. Instead, it is believed sufficient to say that fluid pressure can be introduced through either rifle drilling 65 or 66, through the centrifugally operated valves 67 or 68 so as to actuate either clutch CL5 or CL6 thereby causing a driving connection, respectively, between constant mesh gear member 22 and gear 9 on shaft 8 or between the gear unit 21 and the gear 10 on shaft 8, thereby driving shaft 20.

DYNAMIC DIRECTIONAL SHIFTS

The low range output clutch CL6 may be caused to serve as a brake to absorb the energy of the vehicle inertia, and the rate of this braking function is controlled.

A brief description of the direction braking and soft shift will now be made, assuming the vehicle is travelling in a forward direction. Immediately prior to the time at which braking of the vehicle occurs, that is just prior to the above mentioned "brake-mode", two of the input clutches of opposite direction sense and identical gear ratio are engaged to brake the input section of the transmission to a complete stop. This includes the output range clutch gears and where the low range clutch CL6 is only residually engaged while the above function occurs. These two input clutches remain engaged until completion of the output braking. These serve as anchors to hold the reaction torque from the low range clutch CL6 during braking. These two clutches also hold the stall torque from the torque converter TC during this "brake-mode".

When the braking has been completed, the unselected input direction clutch releases and at the same time, the pressure of the fluid to the low range output clutch CL 6 is increased up to full line pressure and on a short time of rate-of-rise schedule. The vehicle then commences travel in the selected reverse direction in the hyraulic torque converter mode. The torque spike at the end of braking is usually less than applied torque converter stall torque. The over-all shift characteristic is acceptably smooth.

By way of further explanation, a specific example of a shift will now be made. Assuming the vehicle is travelling in a forward direction in second speed range, and at transmission output speeds in excess of "inhibit speed", and a shift to the reverse direction is made. The forward direction input clutch CL2 remains engaged. Simultaneously, the reverse direction input clutch CL4 engages and the low range output clutch CL6 is reduced in torque capacity to a residual amount. Thus, the reverse input direction clutch CL4 brakes the rotating elements between and including the torque converter turbine attached to shaft 1 and output range clutch gears 21 and 22 to a complete stop. Immediately thereafter, the torque capacity of the low range clutch CL6 is increased to "brake-mode" value. Output braking thus commences. The reaction torque from the braking clutch CL6 is held by the stalled out-locked up input clutches until output braking to below inhibit speed (at or near stop) is completed. The two input clutches CL2 and CL4 also hold stall torque from the torque converter TC during this "brake-mode".

When the braking has been completed, the forward input direction clutch CL2 releases and at the same time the pressure of the fluid applying the low range output clutch CL6 is increased up to full main pressure on a short time rate of rise schedule.

Sufficient torque capacity of output clutch CL6 is regained prior to complete release of forward input clutch CL2 such that little or no slippage of clutch CL6 occurs as the stalled-out torque converter becomes power connected to clutch CL6 via reverse input clutch CL4 and related gearing. The vehicle then moves in a reverse direction in hydraulic torque converter power mode. Static lockup of output clutch CL6 at the termination of braking almost always occurs at the reduced "brake mode" apply pressure, resulting in smooth engagement of the clutches without noticeable jerk to the operator.

Direction or Neutral Into Gear Shifts At or Near Stop

Directional or neutral into gear shifts at or near the vehicle stopped position will now be described, and the sequence of events for this function is very similar to the preceding dynamic brake-mode just described.

Two input clutches, the one selected and that of opposition direction sense, but same gear ratio, engage for a time sufficient to stall out the input with the output range clutch residually engaged. Simultaneously, the unselected input clutch releases and the output range clutch apply pressure increases to full main pressure on the short time rate-of-rise schedule. Then the vehicle moves in the selected range and direction in hydraulic torque converter mode. This is a very smooth shift which is obtained automatically on a fixed time basis.

More specific examples of three shifts is as follows.

(a) A Shift from Forward Second to Reverse Second is Made

The forward direction input clutch CL2 remains engaged. Simultaneously, the reverse direction input clutch CL4 commences to fully engage and the low range output clutch CL6 is reduced in torque capacity to a residual amount. Thus, the reverse direction input clutch CL4 brakes the rotatable members between and including the hydraulic torque converter turbine attached to shaft 1 and output range clutch gears 21 and 22 to a stalled-complete stop condition (It is recognized that if said shift is made when the input is at a stalled condition, input braking will not occur-input lockup is appropriate). The fluid apply pressure to the low range output clutch CL6 is then at increased "brake mode" value. Immediately thereafter, the forward direction input clutch CL2 is released and in the process of this release, fluid apply pressure to the low range output clutch CL6 is increasing to full main pressure on a short time rate of rise schedule. Sufficient torque capacity of clutch CL6 is regained such that only a minimal slippage of that clutch is possible as the forward direction input clutch CL2 is released and reversing torque beings to become effective. The vehicle then moves in the reverse direction in hydraulic torque converter power mode.

The above description is specifically correct for same speed range directional shifts such as first forward to first reverse and second forward to second reverse.

(b) A First Forward to Reverse Second Shift is Made

The first forward direction input clutch CL1 is released, then both second reverse input clutch CL4 and second forward input clutch CL2 engage. In the interim between clutch release and clutch apply, the rotatable input members connected to shaft 1 will speed up, after which the engaging input clutches CL2 and CL4 will brake against each other to stall out the input. The functional sequence is otherwise identical to that described in (a).

(c) A Neutral Into Reverse Shift is Made

Both the reverse and forward input clutches related to the selected speed range engage to brake the rotatable members connected to shaft 1 to a stalled condition. The functional sequence is otherwise identical to that described in (a).

The Controls System

Reference will now be made to the hydraulic control system, having reference to FIG. 5 in particular.

The circuit in general includes a source of pressure fluid such as a fluid charging pump CP, a reservoir or sump SU, and a fluid filter FF through which main line pressure is provided to the main conduit MC and to the torque converter TC via the main pressure regulator MR. A lubrication circuit regulating valve LV conducts fluid from the oil cooler OC and torque converter TC back to the sump.

Four separate groups of control valves and related hydraulic circuits will be discussed; the basic function valves; the direction selector over-lap valves; control pressure valves (output clutches' apply pressure); and inhibit system valves and components.

Basic Function Valves

The valves of this group are those which are used in a pilot valve system to obtain basic functions of (1) direction selection; that is, either forward, neutral, or reverse, and (2) speed range selection; that is, either 1st, 2nd, 3rd, or 4th speed ranges, for example.

These valves are A, B, C, D, E, and F and provide a manually operated hydraulic circuit means for selecting an operating condition of a vehicle direction and speed gear ratio.

The rotary direction selector pilot valve A is manually operated and is used for the selection of either forward, neutral, or reverse directions. Valve A is in fluid receiving communication, through link 69, with the fluid pressure source, via the direction selector flow valve H. Valve A serves to head-head this inlet pilot feed pressure in conduit 69 when in the neutral position (FIG. 5). In this position, valve A provides communication of the actuating chamber of both valves B and C with exhaust port 72c at valve H. When shifted to either the forward or reverse position, this valve directs the pilot feed pressure through conduits 69b or 69c to actuate either of the spring loaded valves, namely a forward valve B or a reverse valve C. When actuated, forward valve B or reverse valve C act to direct the main pressure at annular grooves 104 and 104a through the conduits 105 or 106 to appropriate portions of an input clutch range valve D. Valve D is a spring loaded valve which provides fluid passage from the forward valve B and the reverse valve C to the clutch CL1 of the forward clutch unit via conduit 46 and clutch CL3 of the reverse input clutch unit via conduit 55 when valve D is in the spring released position as shown. When the valve D is in the pilot pressure applied position, the valve D provides fluid passage to clutch CL2 of the forward clutch via conduit 45 and clutch CL4 of the reverse input clutch via conduit 56.

The pilot apply pressure is received from the rotary range selector pilot valve E which is manually operated for selection of first, second, third or fourth speed ranges. The first speed range position is shown in FIG. 5. Valve E directs pilot pressure to actuate the input clutches' range valve D when valve E is in the second or fourth speed positions. When valve E is in the third or fourth speed positions, valve E also directs pilot apply pressure to actuated the output clutches' range valve F.

The output clutches' (CL5 and CL6) range valve F when actuated causes the output clutches' regulated pressure at conduit 76a to be directed to the high output range clutch CL5 apply piston via conduit 67. When valve F is in the spring return position, the output clutches' regulated pressure is directed to the low range output clutch CL6 apply piston via conduit 66.

Direction Selector Over-lap Valves and Hydraulic Circuitry

This group of valves forms a hydraulic circuit to simultaneously engage opposite sense input direction clutches. These valves are provided for obtaining a smooth shift and when full throttling shifting occurs at or near a complete vehicle stop, and they cause transmission input section stall-out and release on a fixed time basis. The circuit also provides continuous fluid communication between main pressure at MC and the direction selector valve A via conduit 69.

This group of valves is comprised of an accumulator valve K, a direction selector flow valve H which is in fluid communication with the direction selector valve A, and a check valve J.

This circuit receives pressure fluid from the source CP via line MC. More specifically, the pressure fluid passes from line MC to port 72g, radial slots 72gg, and through a full length axial center hole or passage 70 formed in the spring loaded valve H to port 72f and then to line 69. The inlet of the passage 70 is a restricted orifice 71.

At steady state conditions, the flow valve H and the accumulator valve K are in the spring returned position as shown in FIG. 5. Pressure fluid flow from the main conduit MC to conduit 69 via the passages in valve H is minimal—that of system leakage only. Conduit 69a is connected to a conduit 69 and terminates at port 72e. Port 72e is blocked at land 72j. Conduits 72a from valve A and conduit 72b from valve K are connected to port 72h. Annular groove 72 connects port 72h to exhaust port 72c.

Furthermore, conduit 69 is connected to port 69d at valve A and port 69d is connected to passage 69e.

Examples of Associated Hydraulic Circuitry at Steady State Conditions (a) When valve A is in the neutral position as shown in FIG. 5, the fluid delivery end of passage 69e is blocked and conduit 72a is connected to ports 72k, 72l and passage 72m of valve A. Port 72k is connected to conduit 69c and conduit 69c is in communication with the actuating chamber of reverse vlave C via annular groove 111 and conduit 113. Port 72l is connected to conduit 69b and conduit 69b is in communication with the actuating chamber of FWD valve B via annular groove 112 and conduit 114. Passage 72m is connected to conduit 109 and conduit 109 is in fluid receiving communication with main conduit MC via orifice 85.

(b) When valve A is at the forward position (indicated but not shown in FIG. 5), conduit 69 is connected to conduit 69b via port 69d and passage 69e. Conduit 69b is in pressure fluid communication with forward valve B via annular groove 112 and conduit 114. Valve B is in the fully actuated position—to the left. Conduit 72a is blocked at land 72n and blocked from passage 73m. Conduit 72a is connected to conduit 69c via port 72k. Conduit 69c is in communication with reverse valve C via annular groove 111 and conduit 113. Valve C is in the spring returned to exhaust position.

Descriptive Examples of System Dynamic Function (a) The direction selector valve A is shifted from neutral to the forward position. Flow requirements from the main conduit MC through the orifice 71 of valve H to actuate forward valve B via conduit 69 and through valve A create a pressure drop across the orifice 71. This pressure differential between the fluid receiving and fluid delivery ends of valve H generates a pressure force more than adequate to overcome the force of the resisting spring. Valve H is then fully actuated to the upward position. In this position, the pressure fluid from passage 70 is connected to port 72f via radial slots in that end of valve H and also a slot 72r in the stop plug, port 72f is connected to conduit 69, port 72e connected to conduit 69 via conduit 69a is now connected to port 72h via annular groove 72, and exhaust port 72c is blocked from annular groove 72 at land 72p. Therefore, conduits 72a and 72b continuously connected to port 72h and annular groove 72 are in pressure fluid receiving communication with conduit 69, conduit 72a is connected to the actuating chamber of reverse valve C via port 72 k at valve A, conduit 69c, annular groove 111 and conduit 113, conduit 72b is connected to valve K via orifice 74 in valve J, conduit 72d and port 72g. Thus, reverse valve C is fully actuated as is forward valve B. Accumulator valve K has commenced actuation. The orifice 74 contained in check valve J is of a size proportional to control the rate of fluid delivery to valve K and to insure that pressure drop across the orifice 71 remains sufficient to cause continued full actuation of valve H until valve K is fully actuated. Furthermore, the orifice 74 restriction serves as a bias means to insure that requirements of fluid volume and pressure to fully actuate valves B and C are met first. More specifically, in this system being described, the fluid pressure required to fully actuated valves B and/or C is approximately 28 p.s.i., and that pressure required to fully actuate valve K is 15 p.s.i. Since all three valves are in common fluid communication when valve H is actuated, it is obvious that valve K would be fully actuated prior to valve B and C full actuation with the orifice 74 omitted.

Accumulator valve K is a timing valve which, for example, in the specific system beng described, requires approximately 0.50 seconds to fully actuate. When actuation of valve K is completed, the fluid flow through orifice 71 in valve H is diminished to that of system leakage only. Valve H is spring returned to the steady state position, conduits 72a to reverse valve C and conduit 72b to valve K are connected to exhaust port 72c via port 72h and annular groove 72. Thus, both valves are spring returned to exhaust. As the fluid from valve K is being exhausted, the plate 73 of valve J raises from its seat under the influence of valve K spring return force to the fluid in conduit 72d. This results in quick dumping of valve K.

(b) Direction selector valve A is shifted from forward to the reverse position. The function is identical to the previous shift described with the following exceptions. Pressure fluid flow from the main conduit MC through orifice 71 causing actuation of valve H is that required to actuate reverse valve C. Conduit 69 is connected to valve C via port 69d and passage 69e at valve A, conduit 69c, annular groove 111 of valve S and conduit 113. Conduit 69 is connected to conduits 72a and 72b via conduit 69a, port 72e, annular groove 72 and port 72h. Pressure fluid at conduit 72a is now in communication with forward valve B via port 72I at valve A, conduit 69b, annular groove 112 of valve S, and conduit 114, pressure fluid at conduit 72b is in communication with accumulator valve K for actuation thereof. If the shift from forward to reverse is made sufficiently fast, it is probable that forward valve B will not have spring released to exhaust prior to the time that pressure fluid from conduit 69 is connected to conduit 72a at valve H.

Regulator Circuit-Control Pressure Valves (Output Clutches' Apply Pressure)

This circuit of valves is used to automatically control or regulate the output clutches' apply pressure in the desired sequence and magnitude.

Main Pressure is also affected by this control pressure. The group of valves in this circuit are valves L, M, N, O and P (associated valves are forward valve B and reverse valve C) The circuit is fed from main pressure through an orifice 75 in the main line MC.

This circuit acts to partially engage a third clutch as an output braking means when both the forward and reverse valves are fully actuated, to residually engage said third clutch when the flow valve M is actuated, to reduce main pressure when both the forward and reverse valves are fully actuated and/or when the flow valve M is actuated, and to fully engage said third (output) clutch and regain full main pressure when flow valve M is not actuated and when forward and reverse valves are not simultaneously actuated.

The pressure regulator valve L for the output clutches serves to regulate the apply pressure to the output range clutches CL5 and CL6 during the "brake-mode" function and during transient periods. This valve L does not necessarily regulate at normal steady-state conditions. The regulated pressure is a minimum of 7 p.s.i. for example, when control pressure is zero, and a light spring 78 at the control pressure end of the valve causes this minimum pressure. The spring force positions the valve to admit main pressure supply at land 79 to the annular groove 76 and then to the output clutches' range valve F through line 76a. Also, a radial and axial hole 77 combination connects annular groove 76 in communication with the right end of the valve L which is opposite the spring. When this pressure force at the right end overcome the spring force, the valve will shuttle to alternately open and close the inlet conduit MC at fluted land 79 or find a position to maintain the 7 p.s.i. pressure. Output clutches CL5 and CL6 regulated pressure is control pressure plus 7 p.s.i. At steady-state conditions control pressure in conduit 75a should be the same as main pressure. Main pressure plus spring pressure should position the valve L in the wide open position. Pressure drop across the system feed orifice 75 in excess of the 7 p.s.i. spring pressure (caused by system internal leakage) could result in less than main pressure—output clutches' regulated pressure.

A flow valve M for the input clutches causes complete dumping of the conduit 75a control system pressure at annular groove 107 when it is actuated. This valve is actuated during the time the main pressure is flowing to apply any of the input clutches. The pressure drop across the inlet orifice 80 between conduits MC and 115 is sufficient to overcome the force of resisting spring 81 and the downstream from orifice pressure—causing valve actuation. The valve M is spring returned to the steady-state position when clutch apply flow diminishes to normal leakage volume.

A rate-of-rise valve N functions to cause a slight delay in obtaining full "brake-mode" control pressure after the flow valve M de-actuates. Valve N limits control pressure between, for example, 6 and 11 p.s.i.—on a rate-or-rise basis—during a 0.10 second time delay. In the vehicle "brake-mode", it is desirable that the input section stall-out should occur with minimal resisting torque from the low output clutch CL6. This cup-type spring loaded "timing" or "rate-of-rise" valve N is acted upon by control pressure. That is, valve N is fed from the main pressure line MC through orifice 75. This main line pressure also flows via line 75a to the flow valve M and furthermore flows to the regulator valve L.

A "brake-mode" pressure regulator valve O is of the cup-type spring loaded type and is externally adjustable. Valve O is acted upon by control pressure only when both the forward valve B and the reverse valve C are actuated. Then control pressure from conduit 75a to annular groove 75b of valve B is in communication with conduit 75c, conduit 75c to annular groove 75d of valve C, and annular groove 75d to conduit 75e. Control pressure is then regulated as desired between 22 to 44 p.s.i.

A main pressure regulator reducer valve P causes a reduction of main pressure when the input clutches' internal stalling-out occurs, to thereby reduce clutch spike torque to the mechanical components. The valve P is of the cup-type and is located coaxial with the main pressure regulator valve MR and opposing said valve through the common spring 82. This valve has an area approximately two times that of the main regulator, and it is acted upon by control pressure. The normal, steady-state condition main pressure is approximately 200 p.s.i. Control pressure is also approximately 200 p.s.i. at this condition. Control pressure could be as low as slightly over 100 p.s.i. in order to keep the reducer valve P fully actuated to its stop 83 and to maintain 200 p.s.i. main pressure. When control pressure is 75 p.s.i. or less, the normal 200 p.s.i. main pressure reduces to 150 p.s.i. This reduced main pressure is maintained during the "brake-mode" function.

The Inhibit System (Hydraulic Circuit and Components

Objectives

The purpose of this circuit is to automatically cause simultaneous full engagement of two input clutches, one being forward and the other reverse, when a shift to the direction opposite vehicle motion is made by the operator at transmission output speeds which are above the inhibit speed (the theoretical inhibit speed of the present system for example is 150 RPM as determined at the output clutch's range shaft) and to cause release of the input clutch not related to the direction selected by the operator after the transmission output speed has slowed to below the inhibit speed.

More specifically, when a shift to the direction opposite vehicle motion is made by the operator at transmission output speeds which are above the inhibit speed, this circuit prevents release of the direction valve B or C related to the direction of vehicle motion and permits actuation of the other direction valve B or C related to the direction selected by the operator. Thus both valves B and C are actuated and will remain so until the transmission output has slowed to below inhibit speed at which time the direction valve B or C not related to the direction selected by the operator is permitted to release.

This circuit effects smooth deceleration of the vehicle in that when valves B and C are simultaneously fully actuated, these valves connect pressure fluid in the "output clutch's apply pressure control circuit" to the brake mode regulator valve. This results in partial full pressure apply of the low range output clutch CL6 as a braking means. This inhibit circuit effects smooth acceleration of the vehicle in that the direction valve B or C not related to the direction selected by the operator, is not permitted to release until a vehicle stopped or near stop condition at the termination of output braking is attained and then with the appropriate valve B or C released, the connection in the "output clutch's apply pressure control circuit" to the brake mode pressure regulator valve O is blocked. Output clutch's apply pressure then increases to full main pressure. The power from the torque converter is then released and transmitted through the fully engaged output clutch to accelerate the vehicle.

Components

This circuit consists of an output driven fluid pump Q, bypass valves R, and an inhibit valve S. The pump Q is driven directly at the output range clutch's shaft 20. Pump Q is a means to sense output speed by reason of its fluid delivery rate, and a means to sense direction by reason that said pump Q is a reversible type. The circuit receives pressure fluid from the main conduit MC via orifices 87 and 88.

Circuit Function (Positioning of Valve S)(Valves R)

The function of the circuit is that the valve S is to be centrally located as shown in FIG. 5 when pump Q is not rotating and is to remain essentially centrally located until inhibit speed is attained. At inhibit speed the valve is to be actuated and positioned fully to the left or right by means of higher fluid pressure for actuation thereof being present at the appropriate delivery side of the pump Q. Inhibit speed is predetermined desired speed which is dependent upon main pressure, the size of equal size circuit feed orifices 87 and 88, the rate of fluid flow through the pump Q (pump rating) and the size of equal size circuit exhaust orifices 95 and 96 at valve S. The function of the valves R is that fluid from the appropriate delivery side of pump Q is permitted to bypass to the inlet side of the pump when fluid pressure at the delivery side exceeds pressure at the inlet side by a predetermined amount.

Descriptive Examples of Inhibit Valve S Positioning (a) At Output Stopped Condition Inhibit valve S is at the centered position shown. Pressure fluid from the main conduit MC is connected to conduit 91 via orifice 87, conduit 91 is in fluid communication with valves R, pump Q, the left end of valve S, axial hole 93, radial orifice hole 95, and annular groove 97. Pressure fluid from the main conduit MC is connected to conduit 90 via orifice 88. Orifice 88 is the same size as orifice 87, conduit 90 is in fluid communication with the pump Q, valves R, the right end of valve S, axial hole 94, radial orifice 96 and annular groove 98. Orifices 95 and 96 are of equal size. The distance between the innermost edges of annular grooves 97 and 98 is slightly greater than the distance to the outermost edges of equal size drilled exhaust holes 100 and 101, exhaust hole 100 is blocked from annular groove 97 by land 108, and exhaust hole 101 is blocked from annular groove 98 by land 103. By reason that inlet feed orifices 87 and 88 are of equal size and in fluid receiving communications with common main pressure, any tendency of the valve S to move to the left or to the right would result in alternate opening and closing of annular groove 97 to exhaust hole 100 and annular groove 98 to exhaust hole 101. The valve would remain at the balanced central position. Fluid pressure in conduits 90 and 91 would be the same and should be approximately the same as main pressure.

(b) At Output Rotating in Forward Direction and With Increasing Speed from Below to Above Inhibit Speed Fluid pressures in conduits 90 and 91 are identical. Conduit 91 is in fluid receiving communication with the delivery side (upper) of pump Q and main pressure via feed orifice 87. Conduit 90 is in fluid receiving communication with main pressure via orifice 88 and in fluid delivery communication with the inlet side (lower) of pump Q. All pressure fluid delivered to conduit 90 via orifice 88 is delivered to conduit 91 via the pump Q. The total fluid flow in conduit 91 is the sum of that received via orifices 87 and 88. As previously stated, orifices 87 and 88 are of equal size and with pressures in conduits 90 and 91 being the same it is obvious that fluid flow delivered through each orifice is the same, that pump capacity is the same as flow rate through each orifice, that the fluid flow in conduit 91 is twice that received through each orifice, and is equal to twice pump Q capacity. The fluid pressure in conduits 90 and 91 is main pressure minus the pressure drop across orifices 87 and 88, said pressure drop being dependent on the fluid flow requirements of pump Q as received through orifice 88. The pressure fluid in conduit 91, in communication with and flowing to the left end of valve S actuates said valve to the right to connect annular groove 97 to drilled exhaust hole 100, and annular groove 97 is in fluid receiving communication with conduit 91 via axial hole 93 and radial orifice 95. This connection will automatically adjust to maintain conduit 91 fluid pressure at two times pump Q flow through this connection to exhaust. As pump Q flow increase, pressure drop across orifices 87 and 88 increases, fluid pressure in conduit 91 decreases, valve S is actuated further to the right, and the connection between annular groove 97 and exhaust hole 100 becomes less restricted to permit two times pump Q flow at conduit 91 pressure level to be exhausted. When the axial opening between annular groove 97 and exhaust hole 100 is increased sufficiently (0.060 inch in this specific circuit), this connection betweens ineffective as a restriction to exhaust flow. The effective restriction is then constant, said constant restriction being radial orifice hole 95. With this position of valve S established, and further increase of pump Q fluid capacity will cause actuation of valve S fully to the right to its forward inhibit position. The reason why valve actuation occurs at the specific increased pump Q fluid capacity is that the relationship of fluid flow and pressures in the circuit just prior to actuation becomes invalid. It is obvious that increased two times pump Q fluid flow through the constant restriction orifice 95 to exhaust would require increased pressure in conduit 91 and not decreased pressure as was the case when increasing two times pump Q fluid flow was associated with decreased restriction to exhaust. The pressure in conduit 90 would, and does continue to, decrease with increasing fluid pump demand of the flow through orifice 88. During valve S actuation, the pressure fluid at the right end of said valve is displaced to the inlet of pump Q via conduit 90. With valve S positioned at the forward inhibit position, pressure fluid in conduit 91 remains connected to exhaust hole 100 at annular groove 97. With increasing pump speed, a condition is reached when the increased fluid pressure in conduit 91 and the decreased pressure in conduit 90 results in sufficient pressure differential force acting on lower valve R to overcome the resisting spring force and permit the inlet side of pump Q to be in fluid receiving communication with the delivery side of said pump.

Associated Hydraulic Circuitry (a) Inhibit Valve S Centered (as Shown in FIG. 5)

With the inhibit valve S centered, normal or basic function communication between the direction selector valve A and actuating chambers of direction valves B and C exists, annular groove 111 is connected to valve A via conduit 69c and to the actuating chamber of reverse valve C via conduit 113, annular groove 112 is connected to valve A via conduit 69b and to the actuating chamber of forward valve B via conduit 114. The fluid at port 110 is blocked from annular grooves 111 and 112 by land 110a.

(b) Inhibit Valve S Fully Actuated to the Right(Forward Inhibit Position)

With the inhibit valve S positioned fully to the right and valve A at the forward position, normal basic function communication between valve A and the actuating chamber of reverse valve C exists, annular groove 111 is connected to valve A via conduit 69c and to the actuating chamber of valve C via conduit 113. Furthermore, valve C is in the spring return position, its actuating chamber connected to exhaust at port 72c of valve H via valve A and conduit 72a. Forward valve B is not in normal communication with valve A, forward valve B actuating pressure fluid in conduit 69b from valve A is blocked from annular groove 112 of valve S by land 108, annular groove 112 is connected to the pressure fluid in conduit 109 via port 110, and annular groove 112 is in fluid communication with forward valve B via conduit 114 for actuation thereof.

If, with the valve S positioned to the right forward inhibit position, a shift from forward to reverse is made, it is obvious that forward valve B will remain actuated by conduit 109 fluid pressure. Reverse valve C will be actuated by fluid pressure from valve A via conduit 69c, annular groove 111, and conduit 113. Furthermore, the direction selector overlap system, previously described, will dynamically function as said shift is made but with no effect. More specifically, fluid pressure in conduit 69b blocked at land 108 of valve S will be present for approximately 0.50 seconds, then it is exhausted.

The purpose of the orifice 85 between main conduit MC and conduit 109 is to limit the flow and subsequent pressure in conduit 109 when the selector valve A is shifted to neutral with valve S fully actuated to the left or right. Very low fluid back pressure is essential to insure release of the valve B or C in fluid communication with conduit 109. At this condition, conduit 109 is connected to exhaust port 72 at valve H via valve A and conduit 72a.

Resume

The function and apparatus of the three specific hydraulic circuits are as follows:

(a) the direction selector over-lap circuit; causes simultaneous engagement of two input clutches and subsequent release of one of the clutches (at the stopped condition, the inhibit valve is not actuated);

(b) the inhibit valve circuit; causes simultaneous engagement of two input clutches (above inhibit speed, the inhibit valve is actuated) and also causes subsequent release of one of the clutches below the inhibit speed when the inhibit valve is not actuated; and (c) the output clutches apply pressure control circuit; the output clutch's apply pressure controlled by the circuit pressure which is acting against and controlling the output clutch's regulator valve; the circuit is dumped to exhaust with the flow valve actuated; the circuit is at brake-mode pressure when both the forward and reverse valves are simultaneously actuated; the circuit control pressure is regulated by the brake mode regulator valve when both direction valves are actuated; a rate of rise valve is in communication with the control circuit and a main pressure release valve is in fluid communication with the circuit, and pressure regulating means is effective when both direction valves are actuated or when the flow valve is actuated.

I claim:

1. A shuttle type vehicle having a power transmission including change speed and direction gearing driven by a torque converter, said gearing including forward and reverse direction input clutches and also including output speed range clutches, said clutches being of the selectively and hydraulically actuated friction plate type, a hydraulic control system for said clutches and for permitting reversal of vehicle direction at full throttle, said system comprising: a pressure fluid source, manually operated hydraulic circuit means for selecting an operating condition of a vehicle direction and gear ratio, second hydraulic circuit means to effect deceleration and acceleration of the vehicle when a selection of opposite direction operating conditions is made, said second hydraulic circuit means including (a) means including an output driven fluid pump to sense speed and direction, (b) means to fully engage said direction clutches simultaneously, and (c) means to simultaneously partially engage a second clutch as a braking means.

2. The combination set forth in claim 1 further characterized in that said means for fully engaging said direction clutches simultaneously when said vehicle is moving includes an inhibitor valve for actuating said forward and reverse control valves, said inhibitor valve being actuated by said output driven fluid pump.

3. The combination set forth in claim 1 further characterized in that said means for fully engaging said direction clutches simultaneously when said vehicle is generally stopped includes a direction selector flow valve in pressure fluid feeding communication with said direction selector valve, and an accumulator valve in fluid communication with and actuated by said selector flow valve.

4. A shuttle type vehicle having a power transmission including change speed and direction gearing driven by a torque converter, said gearing including forward and reverse direction input clutches and also including output speed range clutches, said clutches being of the selectively and hydraulically actuated friction plate type, a hydraulic control system for said clutches and for permitting reversal of vehicle direction at full throttle, said system comprising; a pressure fluid source, manually operated hydraulic circuit means for selecting an operating condition of a vehicle direction and gear ratio and including a direction selector valve, a forward control valve and a reverse control valve, an input clutch range valve, an output clutch range valve, and a speed range selector valve; second hydraulic circuit means to effect deceleration and acceleration of the vehicle when a selection of opposite direction operating conditions is made, said second hydraulic circuit means including (a) means to sense speed and direction and including an output driven reversible fluid pump fed selectively through an orifice at each side thereof; (b) means to fully engage said direction clutches simultaneously, and (c) means to simultaneously partially engage a second clutch as a braking means and including a pressure regulator valve for said output clutches.

5. The combination set forth in claim 4 further characterized in that said means for fully engaging said direction clutches simultaneously when said vehicle is moving includes an inhibitor valve for actuating said forward and reverse control valves, said inhibitor valve being actuated by said output driven fluid pump.

6. The combination set forth in claim 4 further characterized in that said means for fully engaging said direction clutches simultaneously when said vehicle is generally stopped includes a direction selector flow valve in pressure fluid feeding communication with said direction selector valve, and an accumulator valve in fluid communication with and actuated by said selector flow valve.

7. A shuttle type vehicle having a power transmission including change speed and direction gearing driven by a torque converter, said gearing including forward and reverse direction input clutches and also including output speed range clutches, said clutches being of the selectively and hydraulically actuated friction plate type, a hydraulic control system for said clutches and for permitting reversal of vehicle direction at full throttle, said system comprising; a pressure fluid source, manually operated hydraulic circuit means for selecting an operating condition of a vehicle direction and gear ratio, second hydraulic circuit means to effect deceleration and acceleration of the vehicle when a selection of opposite direction operating conditions is made, said second hydraulic circuit means including (a) means to sense speed and direction, (b) means to fully engage said direction clutches simultaneously, and (c) regulator circuit means including a regulator valve for regulating and partially engaging said output speed range clutch as a braking means when both of said forward and reverse control valves are actuated.

8. A shuttle type vehicle having a power transmission including change speed and direction gearing driven by a torque converter, said gearing including forward and reverse direction input clutches of one or more speed ranges and also including output speed range clutches, said clutches being of the selectively and hydraulically actuated friction plate type, a hydraulic control system for said clutches and for permitting reversal of vehicle direction at full throttle, said system comprising; a pressure fluid source, a manually operable direction selector valve in fluid receiving communication with said source, an inhibit valve in fluid receiving communication with said direction selection valve, fluid pressure pump circuit means for actuating said inhibit valve, a forward control valve and a reverse control valve in fluid communication with one another and with said source, said forward and reverse control valves being actuated under control of said inhibit valve, an input clutch range valve in fluid receiving communication with said forward control valve and said reverse control valve, said input clutch range valve being a fluid delivering communication with said input clutches for selective actuation thereof, said input clutch range valve being in fluid receiving communication with a manually operable speed range selector valve, an output clutch range valve in fluid receiving communication with said speed range selector valve and in fluid communication with said output speed range clutches for selective actuation thereof.

9. A shuttle type vehicle having a power transmission including change speed and direction gearing driven by a torque converter, said gearing including forward and reverse direction input clutches of one or a plurality of speed ranges and also including output speed range clutches, said clutches being of the selectively and hydraulically actuated friction plate type, a hydraulic control system for said clutches and for permitting reversal of vehicle operation at full throttle, said system comprising; a pressure fluid source, a manually operable direction selector valve, a direction selector flow valve, said direction selector valve being in fluid receiving communication with said source via said direction selector flow valve, an inhibit valve in fluid receiving communication with said direction selector valve, fluid pressure pump circuit means including an orifice fed fluid pump and by-pass valves for actuating said inhibit valve, a forward control valve and a reverse control valve in fluid communication with one another and with said source, said forward and reverse control valves being actuated under control of said inhibit valve, an input clutch range valve in fluid receiving communication with said forward control valve and said reverse control valve when said forward and reverse valves are actuated, a flow rate in fluid receiving communication with said source and in fluid delivery communication with said input clutches, said input clutch range valve being in fluid delivering communication with said input clutches for selective actuation thereof, said input clutch range valve being in fluid receiving communication with a manually operable speed range selector valve, an output clutch range valve in fluid receiving communication with said speed range selector valve and in fluid communication with said output speed range clutches for selective actuation thereof.

* * * * *